Figure 1:
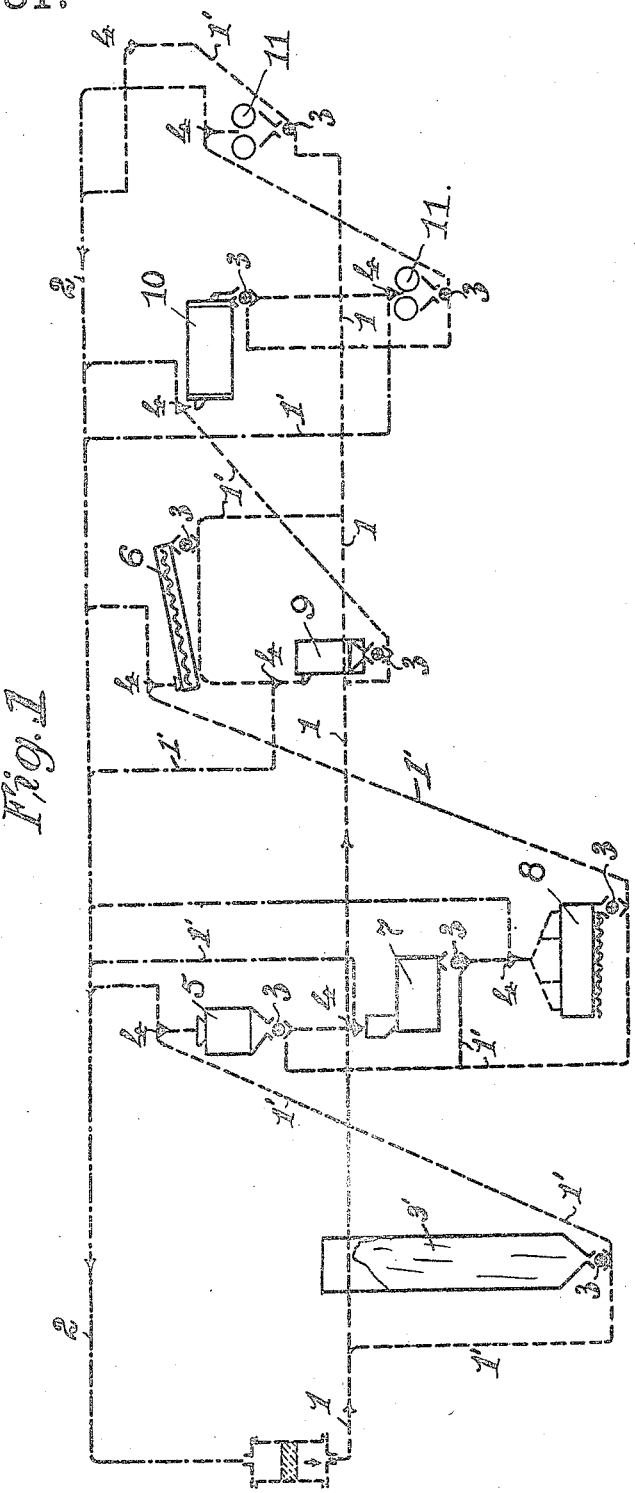

W. REINHARDT.
MILLING PLANT.
APPLICATION FILED AUG. 10, 1910.

1,052,381.

Patented Feb. 4, 1913.

2 SHEETS—SHEET 2.

Attest:
Ed L. Tolson
H. L. Alden

Inventor:
Walter Reinhardt,
by Wm. Wallace White
Attys.

UNITED STATES PATENT OFFICE.

WALTER REINHARDT, OF FRANKFORT-ON-THE-MAIN, GERMANY.

MILLING PLANT.

1,052,381.   Specification of Letters Patent.   Patented Feb. 4, 1913.

Application filed August 10, 1910. Serial No. 576,600.

*To all whom it may concern:*

Be it known that I, WALTER REINHARDT, citizen of the Empire of Germany, residing at 5 Flörsheimerstrasse, Frankfort-on-the-Main, Germany, have invented new and useful Improvements in Milling Plants, of which the following is a specification.

The present invention relates to a milling plant in which the products are forwarded from a central station exclusively by pneumatic action.

The advantages obtained by the present invention may be summed up as follows: The plant for air suction or the compression of air may be erected in any desired part of the building. From this point air suction and air pressure conduits pass through the whole building. To these conduits the feed devices are connected. The forwarding of the separate products is accomplished by placing the feed devices in conduits, thus avoiding the production of heat by friction and also permitting air to be introduced in such proportions as to prevent the possibility of formation of an explosive mixture, consequently providing a dependable preventive against the possibility of dust explosion. The amount of motive power necessary is lessened throughout the whole of the plant and the mechanical efficiency considerably raised. There is no need to carry the separate products to a height in order to give them the necessary fall, and this, under certain conditions, is an inestimable gain. The space occupied by the whole plant is considerably less than was previously required for the devices hitherto in use. As the conduits are everywhere completely closed, valuable powdery products can be transported without loss or danger of loss at the points of ingress and egress.

The danger of local stoppages, which in the systems hitherto in use were frequently caused by the numerous transmissions and cog-wheels, is here reduced to a minimum. Should, however, a stoppage occur by any chance, it is at once remarked at the central station and it can then be remedied without delay, thus avoiding the numerous and serious interruptions in work which in the older systems were so frequent. In conclusion it is possible to keep the degree of humidity at a definite and constant point by heating and moistening the air in the transport devices to the required degree. Those devices moreover which are adapted for driving by means of pneumatic power, can be placed in the air-conduits so as to make use of the air therein, thus enabling the separate machines otherwise necessary for sorting, cleaning or filtering to be either dispensed with or else replaced by cheaper apparatus.

In order to more clearly understand the present invention, reference is to be had to the accompanying diagrammatic drawings in which—

Figure 2:
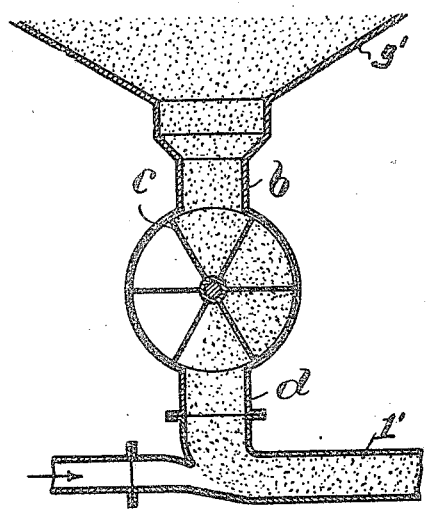
Figure 3:
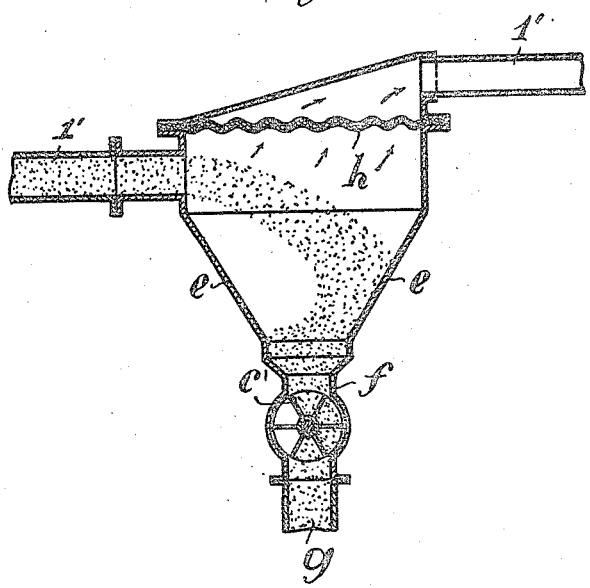

Figure 1 illustrates a plant in which the air is lead in a circuit. The dotted lines denote the air pressure pipes, the line-and-dot lines the air suction pipes. Figs. 2 and 3 are detailed views of special devices.

Referring to Fig. 1 of the drawings, a main pressure pipe line 1 and a suction pipe line 2 are shown connected with a common station adapted to provide the necessary pressure at one port and the necessary suction at an opposite port. Any similar device may be provided for supplying pressure and suction to the pipe lines. The compressed air which is taken from the atmosphere, either through interposed filters or without them, travels through pipe 1 in the direction of the arrow to the first receiving station 3, which is situated under a silo 3″. This receiving station is designated at all times by the reference character 3 and while it may be formed in any suitable manner, I show in Fig. 2 how it may be constructed. As shown in this figure, the vertical pipe *b* leads from the silo 3′ to an air tight casing, containing a cellular wheel *c*, driven by any suitable means. When this wheel is rotated, the individual cells pass under the pipe *b* and are filled with the grain or other material to be conveyed. The air tight casing is connected with the pipe 1′ by a pipe *d* through which the grain falls into the pipe 1′; the latter being connected to the compressed air-pipe 1.

The grain, falling in pipe 1′ is conveyed by the compressed air to the delivery station 4, which is constructed as follows: The delivery station 4 consists mainly of a wide completely closed hopper *e* (see Fig. 3). This hopper tapers toward the lower end to a narrow outflow pipe *f*, under which is arranged a cellular wheel *c′* in an air-tight casing similar to the receiving station 3. Below this cellular wheel *c′* is an outlet pipe *g* through which the grain falls into any suitable apparatus, for instance, into an automatic scale 5. The hopper e is divided into an upper and a lower chamber by a sieve h. To the upper chamber is connected pipe line 1' which leads into suction-pipe line 2.

The mode of action of apparatus 4 is as follows: The conveyed material travels, together with the compressed air, quickly through the pipe 1' and falls into the comparatively wide cone-shaped hopper e. In consequence of the greatly enlarged space the velocity of the air decreases to such an extent that it cannot carry the conveyed material any farther along. Consequently the separation of air and material takes place, as illustrated by the dotted lines of Fig. 4. The conveyed material drops down, while the conveying air escapes through sieve h, which retains all impurities, into suction-pipe line 2. The material falling into the cone-shaped hopper is conveyed by the cellular wheel to another apparatus, either to an automatic scale 5 or a similar device. It will thus be seen that the grain flows under atmospheric pressure from the delivery station to the automatic scale 5. This process is repeated over and over again for each one of the separate machines. Below the automatic scale is also a receiving station 3 into which the compressed air enters from a section of compressed air pipe 1 and carries the grain, after it has been weighed, to a second delivery station 4, which, in turn, is situated over another machine, this time a purifier 6. From there the grain travels again into another receiving station 3, and is carried by another branch of air line 1' to another delivery station 4, which delivers the grain to a drying machine 9 from which it flows again to another receiving station 3. By the constant repetition of the travel from the receiving station to the delivery station the grain is carried successively from dryer 9 to husking machine 10 and from there to the rolling mills 11. From the rolling mills the different products are again carried off in the desired manner by the compressed air. (This latter process is not illustrated in the drawing). All compressed air lines are in one circuit with a compressed air central station or pump and are actuated from this pump in such manner that, when one part leaks, the pressure on all lines is reduced and transportation ceases entirely.

In the arrangement shown there is one central station which comprises both the suction and compression stations in one. In this manner a circuit of air is produced. This arrangement is preferred, when it is not practical to use fresh air for the different transports, and where it is desirable to use the same air over and over again. The air sucked in by the suction pipes, is transmitted back to the compression pump. This arrangement is necessary and offers great advantages, when the air in the mill shows either chemical or physical qualities as to humidity, temperature, etc., which are lacking in the fresh, outside air.

The machines shown are machines for cleansing and milling the grain. For the sake of simplicity, only some of the necessary machines are shown. For instance, the grain travels from the silo 3 to the automatic scale 5. From there to a corn sifting machine 7, then to a cleanser 8, purifier 6, dryer 9, husking machine 10, rolling mill 11, etc.

The mentioned machines are all well known.

Wherever necessary, branch lines 1' of the main air lines 1 and 2 are provided, that is wherever the material passes the machine. These branch lines each begin on the pressure line and end on the suction line and take the compressed air from the main line and carry the same into the machines. We have therefore as many branches as we have machines, into which the material must be carried.

Having fully described my invention what I claim is:—

A milling plant comprising a series of separated devices adapted to perform successive operations upon a material; a main pressure pipe line, and a suction pipe line, branches extending from the pressure pipe line to the suction pipe line at successive intervals from the initial end of said pressure pipe line, each of said branch lines having a receiving station arranged in operative relation to one of said devices and a delivery station arranged in operative relation to the next succeeding device in the series, substantially as described.

In testimony whereof I have signed my name to this specification in the presence of two subscribing witnesses.

WALTER REINHARDT

Witnesses:
ERNST RANER,
KARL MAXAUER.